Aug. 18, 1953
E. F. MILLER
2,648,950
GAS TURBINE ENGINE APPARATUS DESIGNED
TO BURN WET PULVERIZED FUEL
Filed Aug. 24, 1949
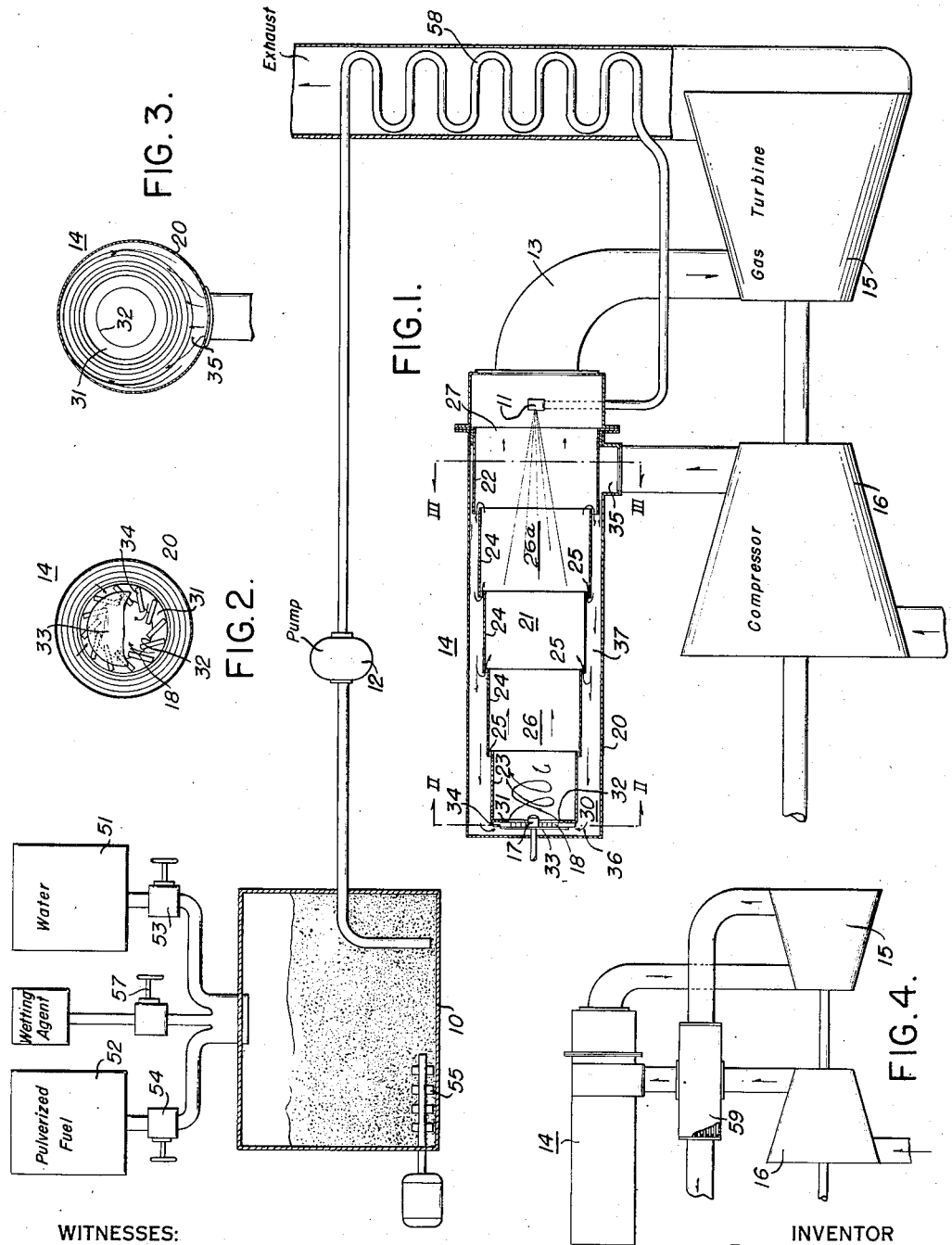
WITNESSES:
V. W. Novak
E. H. Lutz.
INVENTOR
Ernest F. Miller
BY
a. B. Rivers
ATTORNEY Patented Aug. 18, 1953

2,648,950

UNITED STATES PATENT OFFICE 2,648,950

GAS TURBINE ENGINE APPARATUS DESIGNED TO BURN WET PULVERIZED FUEL

Ernest F. Miller, Lansdowne, Pa., assignor to Westinghouse Electric Corporation, East Pittsburgh, Pa., a corporation of Pennsylvania Application August 24, 1949, Serial No. 112,021

2 Claims. (Cl. 60—39.46)

The invention relates to supplying pulverized fuel to a combustor in such manner that improved fuel metering is provided and the pulverized fuel particles are better dispersed and mixed in the fuel combustor.

Where pulverized fuel is supplied to a combustor for the production of gas turbine motive fluid, several difficulties are encountered. Aside from the problem of dust and the explosion hazard on that account, metering is a problem which has not been satisfactorily solved. To overcome these difficulties, I provide a mixture of finely pulverized fuel and water capable of being handled as a liquid. Finely pulverized fuel, when mixed with approximately an equal weight of water, produces a fluent mixture which may be maintained substantially homogeneous by agitation, recirculation, stirring, etc. More or less stable suspensions may be obtained by the addition of suitable dispersing agents, such as the sulphonates, aerosols, and the like, depending upon the fineness of the coal particles.

With coal having a heating value of from 13,000 to 14,000 B. t. u. per pound, an equal weight of water would require only about 1,000 B. t. u. for evaporation. Therefore, it is only necessary to arrange a combustion passage so that the sprayed mixture of pulverized fuel and water is exposed to the heated gases of the combustor either directly or by radiation from heated portions of the combustion chamber and so proportioned that the time of exposure is sufficient for complete evaporation prior to burning. A preheated combustion chamber is desirable for the reason that it is impossible to ignite directly a water-suspended fuel; and, for this reason, auxiliary fuel or electric energy is required for starting.

A combustion arrangement of the above character is advantageous in connection with open cycle gas turbines where combustion is carried on at elevated pressure. The pulverized fuel and water mixture may be conveniently pumped and metered, this being a difficult task when using substantially dry, pulverized or crushed fuel. The steam produced by evaporation of the water component results in lower gas temperature so that less mixing air is required to lower the temperature to a value which is tolerable to a turbine. The steam, in expanding through the turbine, transforms heat energy into mechanical work so that the heat energy required to vaporize the water remains available in the cycle.

The vaporizing heat may be largely obtained from the exhaust gases by using the latter to reheat combustion air. Also, sensible heat may be added to the fuel by preheating it under a pressure sufficiently high to prevent boiling of the water. When the pressure is reduced by throttling to a lower pressure than that corresponding to the boiling point, some of the water flashes into steam, the amount depending on the initial temperature. Since the specific heat of water increases rapidly above the critical pressure, it is possible to heat the fuel high enough with sufficient pressure to cause complete evaporation of the water on expansion to gas turbine pressure levels. While the exact pressure required for such complete evaporation is not definitely known, it exists between 3,100 and 4,000 pounds per square inch. To the extent of absorption of water by the pulverized fuel particles, flashing of such absorbed water into steam would further disrupt the particles and improve combustion.

As it has been established that the fineness of the resulting ash involved with the combustion of pulverized fuel is directly related to the coal particle size and that, if the ash particles are small enough, they will not injure the turbine, the flashing action referred to coupled with refinement of the particles may result in ash or refuse particles small enough to avoid the necessity for using separating devices or to reduce greatly the duty of the latter.

A further feature of the invention is the provision of a combustor having a burner basket providing for drying out the spray, burning the dried fuel particles, and providing for motive fluid flowing toward, about and out beyond the nozzle.

Another feature of the invention is the provision of a combustor, as just described, with auxiliary heating means for starting and for maintaining combustion whenever additional heat is required.

The foregoing and other objects are effected by the invention as will be apparent from the following description and claims taken in connection with the accompanying drawing, forming a part of this application, in which:

Fig. 1 is a flow diagram illustrative of an improved mode for transport and combustion of pulverized fuel;

Figs. 2 and 3 are sectional views taken along lines II—II and III—III of Fig. 1; and Fig. 4 is a diagrammatic view showing turbine exhaust heat used to preheat air.

In the drawing, there is shown a reservoir or receptacle 10 containing a mixture of finely pulverized fuel and water, the mixture being preferably in the ratio of equal parts by weight of each. The liquidized coal is delivered from the receiver to the liquid-type nozzle 11 by means of a pump 12, the nozzle 11 spraying the mixture as a fine mist into the combustor, at 14, which generates motive fluid for operating the turbine 15 carrying the external load and driving the compressor 16.

The combustor 14 in addition to the mixture nozzle 11, has an igniter and heating nozzle 17 supplied with liquid fuel and it is provided with air inlet means, at 13, supplied by the compressor.

The combustor, at 14, includes a cylindrical shell 20 within which there is disposed the basket 21 comprising tubular end sections 22 and 23 and intermediate sections 24, the sections overlapping to provide ingress and egress annular spaces 25 to and from the combustion space or zone 26 and the evaporation space or zone 26a bounded by the sections. The end section 22 provides the combustion chamber open end 27 communicating with the turbine motive fluid supply conduit 13. The end section 23 has end wall structure, at 30, for the other end of the combustion chamber, such end structure comprising the annular plate 31 having a central opening 32 covered by a disk 33 spaced from and fastened to the plate by guide vanes 34.

The shell 20 cooperates with the basket to provide a plenum chamber 35 encompassing the section 22, to provide a space or chamber 36 beyond the end wall structure, and an annular passage 37 connecting the end chambers 35 and 36.

The compressor 16 discharges air into the plenum chamber 35 supplying the passage 37 and the chamber 36. Air is supplied to the combustion zone 26 and evaporation zone 26a through openings 25 as well as the end wall opening 32 for flow toward the open end 27. The shell carries the nozzle 11 arranged to discharge into the basket 21 in a direction opposed to the general direction of air flow.

The igniter or auxiliary heating nozzle 17 supplied with liquid fuel is carried by the end wall construction, at 30, and it is arranged to discharge a spray of atomized liquid fuel within the swirling current of air entering the opening 32.

In addition to swirling air entering the combustion space through the cover opening 32, air also enters such space through the group of annular passages 25 adjacent to the end wall construction, at 30, while media from the basket 21 flows to the passage 37 through the annular passage or passages adjacent to the atomizing nozzle 11. In this connection, it will be noted that the sections 22, 24 and 23 are of successively smaller diameter, whereby the passage 37 diverges from the plenum chamber to the chamber 36 and the radii of the annular passages 25 successively increase in the opposite direction. Thus, there is provided good distribution of air to the basket 21 and recirculation where maximum passage velocities and minimum egress resistance occur.

The portion of the basket 21 beginning at the open end 27 and extending toward the closed end thereof forms a drying or evaporation zone 26a while the remaining portion of the basket constitutes a combustion zone 26. In the drying zone, the water component of the spray is evaporated and the remaining portion of the basket 21 functions as a combustion space for the dried fuel particles. As a substantial extent of the basket from the closed end and toward the nozzle 11 is used as a combustion space and as the general direction of flow due to entering air is toward the atomizing fuel nozzle 11, it will be apparent that heat is utilized advantageously in effecting drying of the fuel and in promoting combustion. Because the annular passages 25 afford ingress from the passage 37 to the basket 21 and egress from the latter to the passage, it will be apparent that unburned fuel particles carried by the motive fluid stream are recirculated, such particles and gaseous media flowing from the basket 21 through the group of passages 25 at the end of the basket adjacent to the atomizer 11 and joining the air stream of the passage 34 to flow along with the latter and enter the basket 21 through the various ingress openings including the group of annular passages 25 more remote from the atomizer. Thus, an unconsumed fuel particle may be retraversed in the basket 21 for combustion.

Since the sprayed mixture of pulverized fuel and water cannot be ignited, it is necessary that the combustion chamber be preheated at least to the extent required for evaporation of the water component followed by ignition of the dried fuel particles.

Therefore, in addition to the nozzle 11, there is provided the nozzle 17 for liquid or gaseous fuel. Such nozzle is arranged to discharge into the combustion chamber 26, the fuel spray being ignited and combustion being carried on to preheat the combustion chamber to the extent just indicated. If the radiant and convection heat resulting from burning of the pulverized fuel particles is adequate to effect the drying action with sufficient rapidity, then, after starting, the fuel supplied to the nozzle or nozzles 17 may be cut off. On the other hand, if additional heat is necessary to maintain the combustion process, fuel is supplied by the nozzle or nozzles 17 to the extent required.

With water and pulverized fuel supplied to the tank 10 from suitable sources indicated generally at 51 and 52 through feeding devices, at 53 and 54, a desired mixture ratio may be readily provided in the supply reservoir 10. The mixture in the reservoir may be kept substantially homogeneous by a stirrer or agitator 55, or a small amount of wetting agent or dispersant, such as ligninsulfonate or aerosol may be added to the mixture, by means including an adjustable valve 57. With a substantially homogeneous mixture maintained in the reservoir and pumpable as a liquid to a liquid-type burner, it will be obvious that handling of the mixture as a liquid is conducive to more accurate and definite metering of the pulverized fuel, the ordinary principles of liquid fuel metering being applicable.

While handling the pulverized fuel suspension as a liquid is advantageous from the point of view of metering and of dispersal of the pulverized fuel particles in the basket 21, evaporation of the water component of the spray requiring heat represented by the latent heat of evaporation of the water component, the system is peculiarly and uniquely suitable when used in connection with a gas turbine for the reason that steam produced by evaporation of the water component results in a lower temperature of gases so that less mixing air is required to lower the temperature to a value which is tolerable to the turbine thus reducing the effort of the compressor in supplying a comparable amount of dilution gas. Also, expansion of the steam in the turbine is accompanied by a transformation of heat energy thereof into mechanical work so that little, if any, of the heat energy required to vaporize the water is lost to the cycle. Accordingly, the basket 21 has its open end communicating with the turbine 15, which, in addition to the external load carried by it, drives the compressor 16 for supplying compressed air to the plenum chamber 35 to maintain pressure combustion in the basket 21.

If desired, the exhaust of the turbine 15, before being discharged to the atmosphere, may be passed through a heat exchanger 58 to preheat the mixture pumped to the nozzle 11, or, as shown in Fig. 4, the turbine exhaust may be supplied to heat transfer apparatus 59 to preheat the air between the compressor and the combustor.

While the invention has been shown in but one form, it will be obvious to those skilled in the art that it is not so limited, but is susceptible of various changes and modifications without departing from the spirit thereof.

What is claimed is:

1. In an open cycle gas turbine arrangement wherein a gas turbine exhausting to the atmosphere drives a compressor for developing air under pressure at its discharge end; a combustor comprising a basket open at one end and having an end wall at its other end, an atomizing nozzle for discharging a spray of fluent mixture of water and pulverized fuel into the open end of the basket, and a casing encompassing the basket and cooperating with the latter to form a plenum chamber at the open end of the basket, to form a cylindrical space beyond the basket end wall, and to provide an annular passage which connects the plenum chamber to the cylindrical space; means including said plenum chamber, the annular passage, and the cylindrical space for supplying air under pressure from the compressor discharge end to the combustion chamber for flow therealong in countercurrent relation with respect to the discharge of the atomizing nozzle, whereby the water component of the spray discharge may first be evaporated in a zone of the basket adjacent to the atomizing nozzle and the dried fuel component may undergo combustion in a zone of the basket more remote from the nozzle to provide motive fluid consisting of steam and products of combustion for operation of the gas turbine; means including openings distributed along the basket and in the end wall thereof to provide for movement of air and gas along the basket and through the open end of the latter; and means utilizing heat of motive fluid exhausting from the gas turbine to the amtosphere to preheat the pumpable fluent mixture supplied under pressure to the atomizing nozzle.

2. The combination as claimed in claim 1 wherein the basket diverges toward its open end and the annular space between the enveloping casing and the basket diverges in the opposite direction, whereby combustion products, pulverized fuel particles and steam may issue from openings adjacent to the open end of the basket and such combustion products, fuel particles and steam may reenter the basket through openings distributed along the basket toward the closed end of the latter.

ERNEST F. MILLER.

References Cited in the file of this patent

UNITED STATES PATENTS

| Number | Name | Date |
|---|---|---|
| 411,555 | Mason | Sept. 24, 1889 |
| 689,746 | Chapman | Oct. 15, 1901 |
| 1,311,984 | Maxim | Aug. 5, 1919 |
| 1,580,656 | de Coninck | Apr. 13, 1926 |
| 2,242,653 | Maxwell | May 20, 1941 |
| 2,385,833 | Nahigyan | Oct. 2, 1945 |
| 2,404,335 | Whittle | July 16, 1946 |
| 2,502,332 | McCollum | Mar. 28, 1950 |
| 2,599,480 | Pfenninger | June 3, 1952 |
| 2,601,390 | Hague | June 24, 1952 |

FOREIGN PATENTS

| Number | Country | Date |
|---|---|---|
| 167,289 | Great Britain | Aug. 5, 1921 |
| 323,219 | Great Britain | Dec. 27, 1929 |
| 585,398 | Great Britain | Feb. 6, 1947 |
| 588,847 | Great Britain | June 4, 1947 |
| 248,548 | Germany | June 25, 1912 |